CIRCUITS USING DOMAIN PROPAGATING DIODES

Filed June 17, 1968

2 Sheets-Sheet 1

INVENTOR
M. R. BARBER

BY Roderick B. Anderson

ATTORNEY

United States Patent Office 3,543,178
Patented Nov. 24, 1970

3,543,178

CIRCUITS USING DOMAIN PROPAGATING DIODES

Mark R. Barber, Summit, N.J., assignor to Bell Telephone Laboratories, Incorporated, Murray Hill and Berkeley Heights, N.J., a corporation of New York Filed June 17, 1968, Ser. No. 737,740
Int. Cl. H03b 7/06
U.S. Cl. 331—57 4 Claims

ABSTRACT OF THE DISCLOSURE

Storage circuits comprise a plurality of parallel connected Gunn-effect diodes biased near their oscillation threshold. The cathode of one diode is capacitively coupled to the anode of the successive diode. A pulse applied to the first diode of the array triggers a traveling electric field domain. When the domain is extinguished at the anode, a voltage pulse appears at the anode of the second diode, a domain is excited in the second diode, and the first diode returns to quiescence. A bistable multivibrator is disclosed in which the cathode of one diode is connected by an inductance with the anode of another diode.

BACKGROUND OF THE INVENTION

This invention relates to pulse generating, storage and processing circuits in which certain advantages are realized through the use of diodes of the type in which traveling electric field domains are exerted in response to the application of a suitable oscillation threshold voltage.

Pulse generating, storage and processing circuits are particularly useful in computer systems which use storage circuits as memory elements and various processing circuits as logic elements, registers, counters, and the like. Because of the desirability of increasing the speed of computers, considerable effort has been made to provide circuits that will generate short duration pulses and that will respond to such pulses with high speeds.

Because of these goals, the Gunn-effect diode, which is capable of generating short duration pulses, has been investigated by workers in the art for possible application in computer circuits. As is described, for example, in the patent of Gunn, 3,365,583, issued Jan. 23, 1968, a Gunn-effect diode comprises a wafer of two-valley semiconductor material contained between opposite ohmic contacts. Upon the application of a sufficient bias voltage across the diode, traveling electric field domains will be nucleated in the wafer which are manifested as sharp output pulses. The copending applications of J. A. Copeland III, Ser. No. 564,080, filed July 11, 1966 and M. Uenohara, Ser. No. 542,168, filed Apr. 12, 1966, both assigned to Bell Telephone Laboratories, Incorporated, describe how the Gunn-effect phenomenon can be used to provide improved logic and memory devices.

SUMMARY OF THE INVENTION

I have found that advantage may be taken of the high speed capabilities of Gunn-effect diodes by interconnecting a plurality of diodes such that the extinguishing of a traveling domain in one diode raises the bias voltage of a successive diode to nucleate a traveling domain in a successive diode.

For example, in accordance with one embodiment of the invention, a pulse train storage circuit comprises a plurality of Gunn-effect diodes connected in parallel, with the cathode of one diode being connected to the anode of the successive diode of the array, and with the cathode of the last diode being connected to the anode of the first diode. Each of the diodes is biased through series connected resistors at a voltage slightly below its threshold for generating Gunn-effect oscillations. An input trigger pulse nucleates a traveling domain in only the first diode and, when the domain is extinguished at the anode of the first diode, the voltage of the cathode increases, thus providing a sufficient bias voltage across the second diode to nucleate a traveling domain in the second diode. In this manner the initial trigger pulse is stepped or circulated from one diode to the next along the array. When a pulse train is used as an input, all the pulses are circulated in their proper sequence along the array for subsequent read-out or retrieval when required.

When only two diodes are used in the manner described above, the resultant circuit acts as an astable multivibrator. That is, the input pulse triggers the first Gunn-effect diode which, upon the extinguishing of the traveling domain, triggers the second diode. When the second diode returns to quiescence, the first diode is again excited, and the pulse is stored in the multivibrator indefinitely.

In accordance with another embodiment of the invention, a bistable multivibrator circuit comprises two diodes connected in parallel which are biased slightly above their threshold voltage. The triggering of a traveling domain in one diode, however, reduces the bias voltage across the other diode, so that at any given time only one of the diodes may oscillate. Application of a trigger pulse switches the devices so that a diode that has been oscillating returns to quiescence when the other diode of the circuit commences oscillation.

These and other objects, features and advantages, along with other modifications and embodiments that may be made in accordance with the invention, may be better appreciated from a consideration of the following detailed description, taken in conjunction with the accompanying drawing.

DRAWING DESCRIPTION

DETAILED DESCRIPTION

Figure 1:
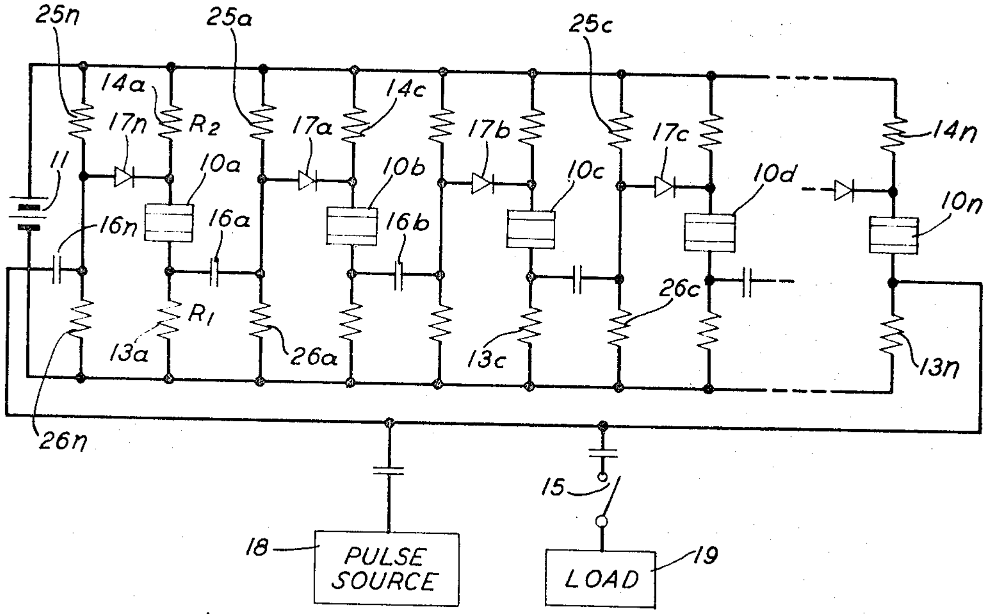
FIG. 1 is a schematic illustration of one illustrative embodiment of the invention.

Referring now to FIG. 1, there is shown an illustrative embodiment of the invention comprising a plurality of Gunn-effect diodes 10*a* through 10*n*, connected in parallel with each other and with a bias source 11. As is known, a Gunn-effect diode comprises a wafer of substantially homogeneous two-valley semiconductor material contained between a cathode contact and an anode contact. Connected in series with each of the diodes are resistors 13*a* through 13*n* each having a resistance $R_1$, and resistors 14*a* through 14*n* each having a resistance $R_2$.

The cathode contact of each of the diodes is capacitively coupled by capacitors 16*a* through 16*n* to the anode contact of the successive diode of the array, except that the cathode contact of the final diode 10*n* is capacitively coupled by capacitor 16*n* to the anode contact of the first diode 10*a*. Diode rectifiers 17*a* through 17*n* are likewise included in the interconnection between the cathode contact of one diode with the anode contact of the successive diode.

The voltage source 11 is selected to apply a bias voltage across each of the diodes which is slightly below the diode threshold of oscillation. As is known, when a bias voltage is applied across a Gunn-effect diode in excess of the diode oscillation threshold, a high electric field domain will be nucleated at the cathode contact. The current through the diode will fall, the voltage across the diode will rise, and the domain will travel toward the anode contact where it will be extinguished. If the bias voltage is maintained above threshold, a new domain will form at the cathode, but if it is not maintained above threshold the diode will return to quiescence. Even if the diode is not maintained above its threshold voltage, a high field domain, once nucleated, will travel to the anode within a characteristic transit time dependent upon diode wafer length and mobility, provided the diode voltage does not fall below a minimum domain sustaining voltage. Gunn-effect diodes typically comprise n-type gallium arsenide wafers having a product of doping concentration and length in excess of $10^{12}$ cm.$^{-2}$.

The purpose of the circuit of FIG. 1 is to store indefinitely a pulse or pulse train from a pulse source 18 and to permit the stored pulse or pulse train to be retrieved or read out when desired for transmission to an appropriate load 19. A positive-going pulse applied by source 18 is directed through rectifier **17*n* to the anode contact of diode 10*a* where it increases the voltage across diode 10*a* by an amount sufficient to nucleate a high electric field domain. When the electric field domain is extinguished at the anode contact of diode 10*a*, the voltage of the cathode contact increases abruptly. This voltage increase is then transmitted via capacitor 16*a* and rectifier 17*a* to the anode contact of diode 10*b* where it nucleates an electric field traveling domain in diode 10*b*. This process is repeated such that a single pulse sequentially excites domains in all the diodes of the array, and, since the final diode 10*n* is connected to the first diode 10*a*, the pulse is repeatedly circulated along the array. The stored pulse may be read out by closing switch 15 to connect the circuit to a load 19**.

Figure 2A:
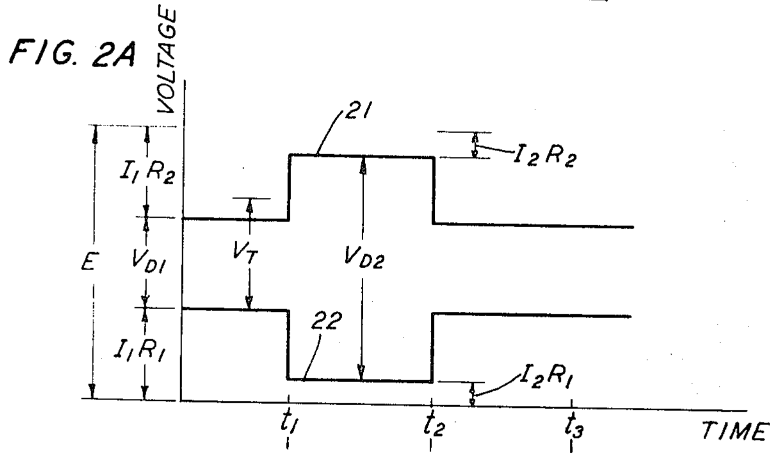
FIG. 2A is a graph of voltage versus time in one diode of the embodiment of FIG. 1.
Figure 2B:
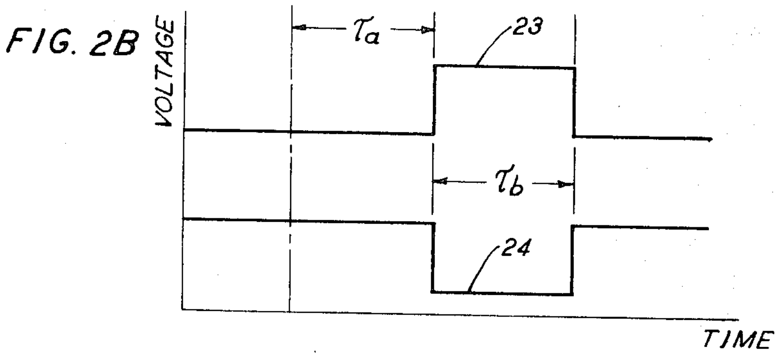
FIG. 2B is a graph of voltage versus time in another diode of the embodiment of FIG. 1.

The storage mechanism is illustrated in FIGS. 2A and 2B in which curve 21 is a graph of the voltage on the anode contact of diode **10*a*, curve 22 is a graph of the cathode voltage of diode 10*a*, curve 23 illustrates the anode voltage of diode 10*b*, and curve 24 is the cathode voltage of diode 10*b*. Referring to FIG. 2A, the voltage E supplied by source 11 establishes an initial current $I_1$ through the diode 10*a*, giving rise to a voltage drop $I_1R_2$ through resistor 14*a*, a voltage $V_{D1}$ across diode 10*a*, and a voltage drop $I_1R_1$ through resistor 13*a***. As shown in the figure, the voltage $V_{D1}$ is lower than the threshold voltage of oscillation $V_T$ and the diode is therefore initially in a quiescent state.

Assume that at time $t_1$ a pulse from pulse source 18 is applied to the anode contact of diode **10*a*. This causes a high field domain to be nucleated at the cathode contact, which in turn causes an immediate current drop through the diode and increases the voltage across the diode to $V_{D2}$. The nucleation of the domain, while causing an increase of the voltage on the anode contact (curve 21), also causes a drop of the voltage on the cathode contact (curve 22**).

With diode **10*a* having a characteristic transit time $\tau_a$, the traveling electric field domain in diode 10*a* is extinguished at the anode contact at time $t_2$, thus causing a drop of the anode voltage and an increase of the cathode voltage to the quiescent state at which the voltage across the diode is again $V_{D1}$. The abrupt increase of the cathode voltage of diode 10*a* is transmitted through capacitor 16*a* and rectifier 17*a* to the anode contact of diode 10*b*. This in turn causes the anode voltage of diode 10*b* (curve 23) to rise to a sufficient value to nucleate a domain in diode 10*b*. This of course is accompanied by a drop of the cathode voltage of diode 10*b* (curve 24**), and the process repeats itself.

From the foregoing it can be appreciated that a single high field domain is sequentially excited in each diode of the array and that, in effect, the initial pulse is circulated along the array. As mentioned before, the cathode contact of the final diode **10*n* is connected to the anode contact of the first diode 10*a* so that when the domain is extinguished in diode 10*n*, a domain is excited in diode 10*a***.

Rectifiers 17 are included to ensure that the pulse from one diode excites a pulse in the succeeding diode rather than the preceding diode. That is, the rectifier **17*a*, for example, prevents the abrupt drop of the anode voltage of diode 10*b* (curve 23) at time $t_3$ from being transmitted to the cathode of diode 10*a* where it might nucleate a domain. Also, the rectifier 17*a* permits the cathode voltage rise at time $t_2$ of diode 10*a* (curve 22) to be transmitted to diode 10*b* but, in effect, the voltage drop of curve 22 at time $t_1$ is not transmitted. The purpose of resistors 25*a* and 26*a* is to discharge capacitor 16*a* during the time between $t_1$ and $t_2$. As such, the R-C time constant of the resistors and capacitors 16*a*** should be shorter than $\tau_a$.

If the output of diode **10*n* is transmitted directly to the load rather than being fed back to diode 10*a*, the circuit of FIG. 1 constitutes a delay line. That is, a pulse input to diode 10*a* will be delayed by a finite and predictable time period before it is released by diode 10*n***.

Figure 3:
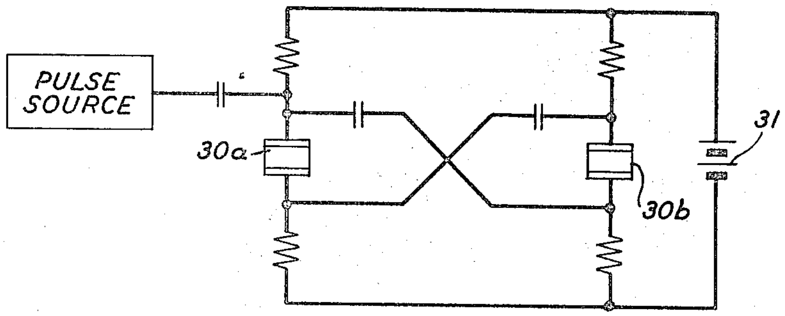
FIG. 3 is a schematic illustration of another embodiment of the invention.
Figure 4A:
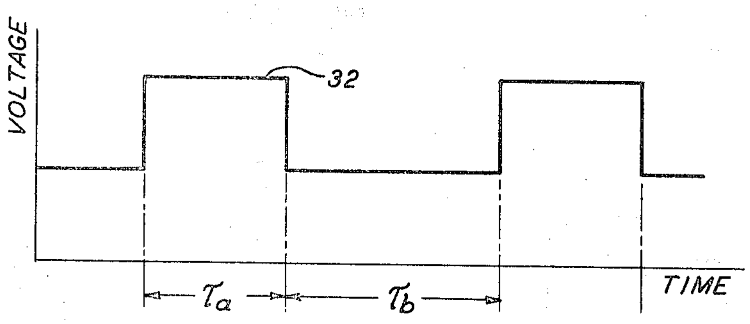
FIG. 4A is a graph of voltage versus time in one diode of the embodiment of FIG. 3.
Figure 4B:
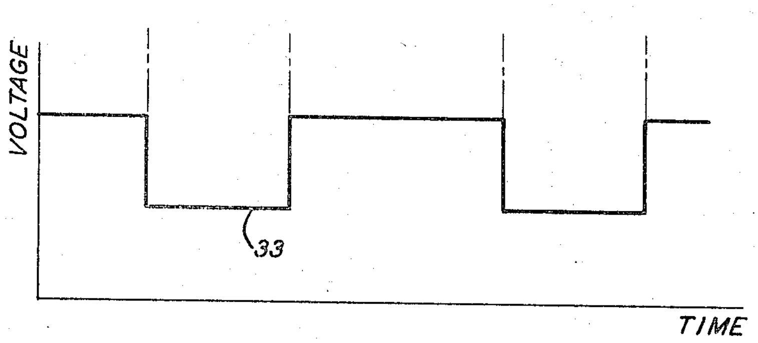
FIG. 4B is a graph of voltage versus time in the other diode of the embodiment of FIG. 3.

If only two Gunn-effect diodes are used in the circuit array of FIG. 1, the circuit constitutes an astable multivibrator as is illustrated in FIG. 3 in which two Gunn-effect diodes **30*a* and 30*b* are connected in parallel with a bias source 31. Curve 32 of FIG. 4A shows the anode voltage of diode 30*a* and curve 33 of FIG. 4B shows the anode voltage of diode 30*b*. As before, excitation of a domain in diode 30*a* causes a voltage increase across the diode which persists during the transit time $\tau_a$ of the domain across the diode wafer. When the domain in diode 30*a* is extinguished, a domain is nucleated in diode 30*b***, causing a voltage rise which persists during the characteritsic transit time $\tau_b$. As illustrated in FIGS. 4A and 4B, the transit times of the two diodes need not necessarily be the same, but may be tailored as in a manner known in the art to give a desired output. For example, the circuit of FIG. 3 may be used as a square wave generator as well as a memory element.

Figure 5:
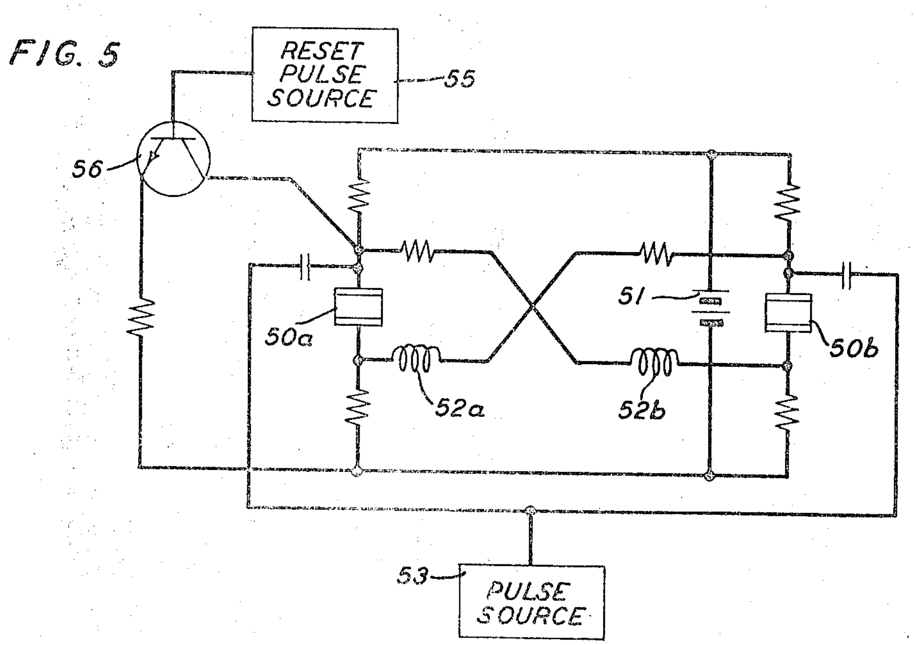
FIG. 5 is a schematic illustration of still another embodiment of the invention.

FIG. 5 illustrates the use of two Gunn-effect diodes **50*a* and 50*b* as a bistable multivibrator. In this case, the two diodes are substantially identical and the voltage applied by bias source 51 is slightly above, rather than below, the threshold voltage of oscillation. However, due to inherent nonuniformities, noise, etc., a traveling electric field domain will preferentially form in one of the two diodes, and when it does, the voltage across the other diode will be reduced to preclude the formation of a domain. For example, if a domain forms in diode 50*b*, the voltage drop at the cathode will be transmitted to the anode contact of diode 50*a* thus reducing the voltage across diode 50*a*. Inductors 52*a* and 52*b* are chosen to filter or attenuate high frequency oscillations so that, once excited, diode 50*b* will continue to oscillate indefinitely, and diode 50*a*** will remain in quiescence indefinitely. Other attenuating devices could alternatively be used.

The states of the diodes may be switched by applying a pulse from a pulse source 53. Assuming that diode **50*b* is oscillating, a positive-going pulse from source 53 will increase the voltage across diode 50*a* to a value above its oscillatory threshold, thus nucleating a domain in diode 50*a*. This in turn will result in a voltage drop across diode 50*b* thereby terminating oscillation in diode 50*b*. In this manner any pulse from source 53** will switch the states of the bistable multivibrator.

The various functions to which bistable multivibrators may be used, and the peripheral circuitry that may be used with them are well known in the art and therefore will not be discussed in detail. For example, a number of bistable multivibrators may be coupled together to form a binary counter. An auxiliary or reset pulse source 55 may be used to ensure that a specific one of the two diodes of the multivibrator is initially excited. For example, a transistor switch 56 is normally open and does not affect circuit operation. However, when a pulse from source 55 is transmitted to the switch, the switch is closed, the voltage across diode 50*a* is reduced, and oscillations are preferentially excited in diode 50*b*. Thereafter, the states of the multivibrator may be switched as before and the circuit may be used to perform any of a number of known functions.

Although the circuit of FIG. 5 differs from those of FIGS. 1 and 3 in that in the absence of any domains the voltage supplied by source 51 is above the oscillatory threshold, it uses the same principle in that the voltage on one diode controls the voltage across the other diode. In all the embodiments, this is possible because the diode contacts are connected in series with resistors rather than being directly connected to the voltage source. This permits the voltages on both contacts to vary as shown, for example, in FIGS. 2A and 2B. The voltages across resistors $R_1$ and $R_2$ vary depending on the currents $I_1$ and $I_2$, and this same principle applies to FIG. 5.

The foregoing embodiments have been presented merely to illustrate the various features and functions of the invention. Various other embodiments and modifications may be made by those skilled in the art without departing from the spirit and scope of the invention. In particular, while Gunn-effect diodes have been used as examples throughout, any diode capable of forming and propagating high electric field traveling domains could alternatively be used. The copending application of Hakki, Ser. No. 638,417, filed May 15, 1967 and assigned to Bell Telephone Laboratories, Incorporated, for example, shows how high field domains can be excited in certain acoustic wave propagating semiconductors.

What is claimed is:

1. In combination:

first and second diodes connected in parallel;

each diode having a first contact and a second contact containing therebetween a body of semiconductor material of the type capable of propagating between the contacts traveling electric field domains in response to an applied oscillation threshold voltage;

means for applying across each diode a bias voltage which is slightly lower than the oscillation threshold voltage of the diodes;

means for applying to one diode a trigger pulse of sufficient voltage to bias it beyond its oscillation threshold, thereby exciting a traveling electric field domain in the diode; and means for capacitively coupling the first contact of one diode to the second contact of the other diode, whereby the extinguishing of a traveling electric field domain in one diode excites a traveling electric field domain in the other diode.

2. The combination of claim 1 further comprising:

a plurality of other domain-propagating diodes connected in parallel with the first and second diodes and forming therewith an array of diodes;

means for capacitively coupling the first electrode of each diode to the second electrode of the successive diode of the array; and means for applying the trigger pulse to the first diode of the array, whereby the diodes of the array are excited sequentially.

3. The combination of claim 2 further comprising:

means comprising a rectifier included in the interconnection between successive diodes for preventing pulse energy of a diode from triggering a traveling domain in a preceding diode of the array.

4. The combination of claim 3 wherein:

the voltage applying means comprises a D.C. voltage source connected in parallel with the diodes, and resistors connected in series with each contact of the diodes.

References Cited

UNITED STATES PATENTS

| | | | |
|---|---|---|---|
| 2,777,067 | 1/1957 | Higby | 331—57 |
| 3,452,221 | 6/1969 | Gunn | 331—107 |

JOHN KOMINSKI, Primary Examiner

U.S. Cl. X.R.

331—107, 113